(12) United States Patent
Bregant-Belin

(10) Patent No.: US 8,543,435 B2
(45) Date of Patent: Sep. 24, 2013

(54) METHOD FOR CONTROLLING AT LEAST ONE APPLICATIONS PROCESS AND CORRESPONDING COMPUTER PROGRAM PRODUCT

(75) Inventor: Pierre Bregant-Belin, Versainville (FR)

(73) Assignee: France Telecom, Paris (FR)

( * ) Notice: Subject to any disclaimer, the term of this patent is extended or adjusted under 35 U.S.C. 154(b) by 447 days.

(21) Appl. No.: 12/743,091

(22) PCT Filed: Nov. 7, 2008

(86) PCT No.: PCT/FR2008/052017
§ 371 (c)(1),
(2), (4) Date: May 14, 2010

(87) PCT Pub. No.: WO2009/071778
PCT Pub. Date: Jun. 11, 2009

(65) Prior Publication Data
US 2010/0269113 A1    Oct. 21, 2010

(30) Foreign Application Priority Data
Nov. 16, 2007   (FR) ...................................... 07 59121

(51) Int. Cl.
*G06Q 10/00*    (2012.01)
(52) U.S. Cl.
USPC ........................................................ 705/7.11
(58) Field of Classification Search
USPC ........................................................ 705/7.11
See application file for complete search history.

(56) References Cited

U.S. PATENT DOCUMENTS

| | | | | |
|---|---|---|---|---|
| 7,206,807 | B2 * | 4/2007 | Cheenath | 709/203 |
| 2002/0120679 | A1 * | 8/2002 | Hayton et al. | 709/203 |
| 2002/0199025 | A1 * | 12/2002 | Kutay et al. | 709/250 |
| 2004/0143645 | A1 | 7/2004 | Cheenath | |
| 2006/0206861 | A1 * | 9/2006 | Shenfield et al. | 717/106 |

OTHER PUBLICATIONS

M. Juric: "A Hands-On Introduction to BPEL" Oracle White Paper, [Online] 2005, pp. 1-12, XP002490390 Retrieved from the Internet: URL: http://www.oracle.com/technology/pub/articles/matjaz_bpell.html A Hands-On Introduction to BPEL> [retrieved on Jul. 28, 2008] p. 3, line 12-p. 5, col. 20; figures 3-6.
M. Juric: "Resources for Java Server-Side Developers" University of Maribor, [Online] pp. 1-3, XP002490391, Retrieved from the Internet: URL: http://lisa.uni-mb.si/{juric/paperss.htm Matjaz B. Juric—Papers> [retrieved on Jul. 28, 2008] p. 1, line 6.
Brambilla M. et al: "Managing Asynchronous Web Services Interactions" Web Services, 2004. Proceedings. IEEE International Conference San Diego, CA, USA Jul. 6-9, 2004, Piscataway, NJ, USA, IEEE, Jul. 6, 2004, pp. 80-87, XP010709408.

(Continued)

*Primary Examiner* — Romain Jenaty
(74) *Attorney, Agent, or Firm* — David D. Brush; Westman, Champlin & Kelly, P.A.

(57) ABSTRACT

A method and apparatus are provided for controlling at least one application process comprising a plurality of application services, which are executed in an application environment in order to provide a service. One such method includes steps enabling a globally asynchronous implementation of the aforementioned application services without generating a timeout in relation to a client that requested the implementation of said application process.

6 Claims, 5 Drawing Sheets

(56) References Cited

OTHER PUBLICATIONS

E. Chinthaka: "Develop Asynchronous Web Services with Axis2" Developerworks [Online] Oct. 11, 2007, pp. 1-6, XP002490392. Retrieved from the Internet: URL: http://www.ibm.com/developerworks/webservices/library/ws-axis2/ Develop Asynchronous Web Services with Axis2 [retrieved on Jul. 28, 2008] p. 1, line 7-p. 4, line 29.

Giancarlo Tretola et al: "Client-Side Implementation of Dynamic Asynchronous Invocations for Web Services" Parallel and Distributed Processing Symposium, 2007. IPDPS 2007. IEEE International, IEEE, PI, Mar. 1, 2007, pp. 1-8, XP031175467.

French Search Report and Written Opinion, dated Jul. 31, 2008 for corresponding French Application No. FR0759121, filed Nov. 16, 2007.

International Search Report and Written Opinion, dated May 27, 2009 for corresponding International Application No. PCT/FR2008/052017, filed Nov. 7, 2008.

\* cited by examiner

METHOD FOR CONTROLLING AT LEAST ONE APPLICATIONS PROCESS AND CORRESPONDING COMPUTER PROGRAM PRODUCT

CROSS-REFERENCE TO RELATED APPLICATIONS

This application is a Section 371 National Stage Application of International Application No. PCT/FR2008/052017, filed Nov. 7, 2008 and published as WO 2009/071778 on Jun. 11, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of technologies aimed at controlling applications services, for example Web services accessible by means of a terminal connected to a communications network.

The present disclosure pertains more particularly to the implementation of services. Such implementation can be applied in the context of what is known as an "n-tier" service architecture, namely an architecture bringing into play several software components. A software component, also commonly called an applications component, can implement or execute a combination of several services (Web services for example) to be rendered to a client who requests them.

BACKGROUND OF THE DISCLOSURE

The term "client" must be understood here and further below in the description as a term that designates an entity that makes direct or indirect demands upon the resources of another entity to execute a task, a client possibly taking the form of an autonomous server, a group of servers, an application (such as an internet browser) or various elements separately distributed within various communications means included in the system.

The term "service" must be understood as the expression of the implementation of one or more functions according to a determined business sequencing used to obtain an equally determined result, such a result possibly serving as input data for another service. Indeed, a service can implement other services (for example Web services). A service can be described by means of a particular language such as BPEL (Business Process Execution Language) to enable its orchestration.

BPEL is a standard based on XML (Extensible Markup Language) used to describe business processes (here below also called applications processes) implementing Web service interactions compliant with the expectations of Web 2.0, especially in terms of dynamic quality.

The BPEL can be used especially to implement complex business processes in a synchronous mode: a BPEL process will therefore call upon Web services through requests and await responses before continuing to execute its other tasks (calling other Web services). A BPEL process can also be perceived by the clients wishing to invoke it as a synchronous Web service as such.

One drawback of this synchronous implementation is related to the execution time (often lengthy) of a BPEL applications process.

Indeed, a process of this kind, which implements numerous Web services synchronously or even asynchronously, sequentially or in combination, is often lengthy in its execution and can prompt a timeout for the caller, i.e. the client who is requesting the execution of an applications business process (of the BPEL process type) formed by a consistent set of Web services.

A "timeout" can be likened to an untimely stoppage of the client when a time of response to a request has gone beyond a certain time limit. A known and common example of a timeout takes place when a user tries to access a Web page that exists and whose downloading gives rise to an excessively lengthy waiting time (because the data is too bulky) for the service originating the request for downloading. The Web server then sends a timeout. Because of the sequencing of several Web services synchronously or even asynchronously, a comprehensive BPEL applications process can prompt such a timeout for the client since this client receives any response to its request immediately or within a reasonable period of time.

To mitigate this drawback, extensions have been added to BPEL in order to provide for the management of asynchronous calls (for the Web services invoked by the BPEL process as well as for the BPEL process itself relative to a client that has invoked it). An asynchronous implementation of this kind can be done by bringing other emerging standards into play, for example especially "WS-Addressing" used in conjunction with SOAP (Service Oriented Architecture Protocol). The principle of asynchronous calling using "WS-Addressing" is based on the implementing, within the calling party and the called party, of a client and a server. For example:

Let "A" and "B" be two entities. "A" wishes to implement an asynchronous process proposed by "B". To this end, "A" comprises a client "$WC_A$", which will call the process of "B", and a server of "$WS_A$" which will subsequently receive the result coming from "B", when the service has been performed. This client "$WC_A$" and this server "$WS_A$" must share certain items of data enabling the connection of the call and the return of the response for "A";

the client "$WC_A$" of the entity "A" calls the asynchronous server "$WS_B$" of the entity "B" (process) in sending it an "endpoint" (URI or Uniform Resource Identifier) of the return "$WS_B$" and a unique instance identifier;

once the BPEL processor "B" has performed the required actions, it sends back the response to the entity "A" in calling the server "$WS_A$" of "A" (the endpoint previously passed by "A") by means of its client "$WC_B$" of the entity "B" in specifying the unique instance identifier (previously passed by "A").

A "URI" is a string of characters identifying a, physical or abstract Web resource.

One drawback of this asynchronous calling technique is related to the cumbersome nature of the mechanisms to be implemented. Indeed, in our previous example, "A" has to implement both a client "$WC_A$" and a server "$WS_A$", and must furthermore implement, both on this client and this server, not only the SOAP protocol but also other standards (especially "WS-Addressing") which are not necessarily integrated into all the currently used development tools and are therefore lengthy and complex in their implementing.

Thus, the benefits of the BPEL, precisely those of creating and implementing business processes in a simple and swift manner, are lost.

Another drawback of this asynchronous calling technique is that it is not compatible with an embodiment in which the client is a Web browser (or a light terminal) interfacing with a Web application. Indeed, while a Web browser can be found in any client station, an applications server is rarely found. This means that the previously described asynchronous call approach cannot be implemented to mitigate the problem of obtaining a timeout from the client side when the client is a Web browser.

SUMMARY

An exemplary aspect of the disclosure relates to a method for controlling at least one applications process that does not have these drawbacks.

According to an exemplary embodiment of the invention, an applications process is constituted by a plurality of applications services, and said method advantageously comprises:
- receiving a request for activating at least one applications process;
- transmitting at least one piece of information representing a start of activation of said applications process called a piece of activation information;
- executing each of said applications services;
- transmitting a piece of information representing an end of execution of each of said applications services;
- transmitting at least one piece of information representing an end of activation of said applications process, said step taking account of each of said pieces of information representing an end of execution of each of said applications services.

Thus, an embodiment of the invention relies on a wholly novel and inventive approach for orchestrating, i.e. perfectly and consistently controlling, the sequential or combined execution of applications services (of the Web services type for example) constituting an applications process, for example of a BPEL type.

An embodiment of the invention indeed enables the supply of information for activating the applications process, thus enabling a caller (i.e. an entity who has originated the activation request) to be informed on the starting of the applications process and on the end of execution of the applications process, before it is possible to activate said applications process for a second time.

Thus, an embodiment of the invention prevents the occurrence of timeouts, and then makes it possible to prevent untimely and unexpected stoppages in an applications process simply because waiting time limits have been exceeded.

Furthermore, the transmission for each of the applications services of a piece of information representing an end of their respective execution provides for an indication on the overall behavior of the applications process. Indeed, these pieces of information on the end of execution of an applications service make it possible to indicate for example the occurrence of an error. Thus, these pieces of information may serve either to dynamically modify the behavior of the business process as a function of errors or to perform diagnostics of errors. Furthermore, these pieces of information on the end of execution can also be used to facilitate development by offering the developer the possibility of controlling the efficient sequencing of the execution of each of the services involved in an applications process.

According to one particular characteristic of an embodiment of the invention, said method comprises a step, prior to said step of transmitting at least one piece of information representing a start of activation, executing a synchronous service delivering said at least one piece of information on activation.

Thus, the execution of a synchronous application service provides for immediate information on a start of activation, thus enabling a client to avoid a crossing of a time limit after it has requested the execution of a business applications process.

According to one particular embodiment of the invention, said at least one applications process is of the BPEL type.

Thus, an embodiment of the invention provides for an activation of the BPEL process using a client application such as an internet browser. An embodiment of the invention therefore prevents an implementation of mechanisms based on standards such as "WS-Addressing". An embodiment of the invention enables the invocation of a first synchronous service prior to the implementation of the other application services. Thus, a client wishing to implement a lengthy and comprehensively asynchronous receives an immediate response from a first synchronous service. This response is sent to the client. This is followed by one or more executions of applications services that cause no anomalies for the client. Indeed, the client will have already obtained a response to its request from the synchronous service.

An embodiment of the invention therefore makes it possible for example to use the BPEL orchestration engine in combination with an internet browser and thus allow for lengthy, comprehensively asynchronous orchestrations while at the same time using only synchronous calls on the client side (the internet browser), something that is not possible with prior art mechanisms.

According to an advantageous characteristic of an embodiment of the invention, at the end of said step of executing a synchronous service, a step is executed which inserts said piece of activation information into a database if such a piece of activation information has not already been inserted relative to said applications process, so as to provide an indicator according to which said applications process is being executed and cannot be activated again before the end of its current execution.

Thus, an embodiment of the invention provides for a centralized indication, within a database, of an implementation of the already ongoing process.

Furthermore, an embodiment of the invention can be used to inform a client wishing to launch the execution of the process that this process cannot be executed because another implementation or execution of this very same applications process is already ongoing.

An embodiment of the invention also pertains to a device for controlling at least one applications process comprising a plurality of applications services.

According to an embodiment of the invention, such a device comprises:
- mean for receiving a request for activating at least one applications process;
- means for transmitting at least one piece of information representing a start of activation of said applications process called a piece of activation information;
- means for executing each of said applications services;
- means for transmitting a piece of information representing an end of execution of each of said applications services;
- means for transmitting at least one piece of information representing an end of activation of said applications process, said step taking account of each of said pieces of information representing an end of execution of each of said applications services.

According to another aspect, an embodiment of the invention also pertains to a computer program product downloadable from a communications network and/or recorded on a computer-readable carrier and/or executable by a microprocessor, and comprising program code instructions for executing the method for managing as described here above.

BRIEF DESCRIPTION OF THE DRAWINGS

Other features and advantages shall appear more clearly in the following description of a preferred embodiment given by way of a simple illustratory and non-exhaustive example, and from the appended drawings, of which.

DETAILED DESCRIPTION OF ILLUSTRATIVE EMBODIMENTS

An embodiment of the invention therefore provides for a simplified implementation of a set of comprehensively asynchronous, applications services constituting an applications process without making it necessary to implement complex and costly information-processing architectures by the client wanting this applications process to be implemented.

The general principle of an embodiment of the invention relies on synchronous supply (i.e. the sending of a request invoking the applications process prompts the sending of a response within a short time lag i.e. within a time shorter than the time of the timeout).

Figure 1:
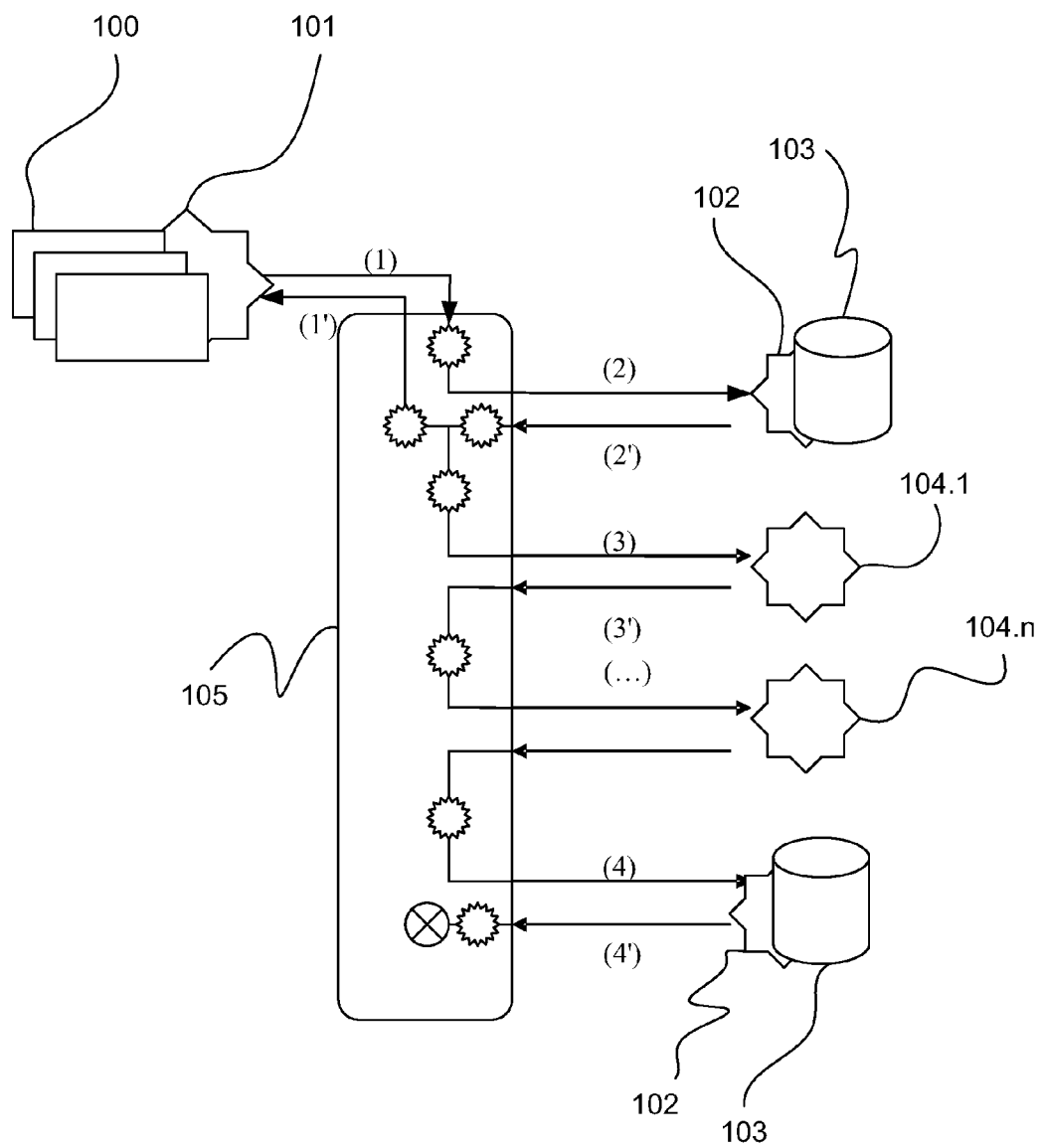
FIG. 1 presents an information-processing architecture in which the method of an embodiment of the invention is implemented.
Figure 2:
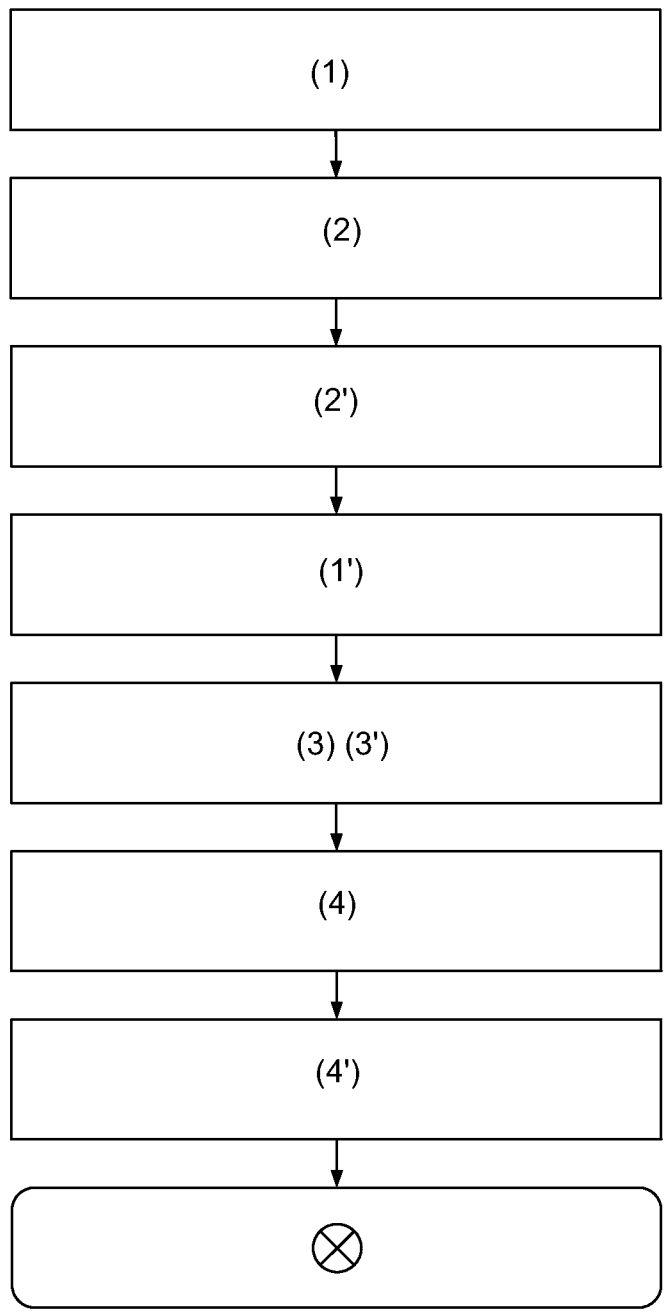
FIG. 2 illustrates the steps for implementing the method of an embodiment of the invention in the context of the architecture of FIG. 1.

To this end, the method of an embodiment of the invention implements the following steps presented with reference to FIGS. 1 and 2.

The client 100 sends (1) by means of an interface 101 a request for invoking an applications process (whose object is the implementation of at least one applications service). This request is received by the process-executing system 105.

The process-executing system 105 launches the execution (2) of a synchronous service 102.

This synchronous service 102 gives (2' and then 1', by means of a system 105) the client 100 a piece of information on a start of activation of the applications process. The information on start of activation can be saved if necessary and maintained for subsequent use in a database 103.

The system 105 executes (3, 3') the applications services (104.1 to 104.*n*) which form the applications process. At the end of the execution of the applications process, a piece of information on the end of implementation of the applications process is provided (4) to the synchronous service 102 and then to the system 105 (4') and subsequently retransmitted to the client 100.

Thus, an embodiment of the invention enables the client 100 to be provided with a synchronous response to the implementation of a comprehensively asynchronous applications process, which may be lengthy and therefore go beyond the timeout.

Here below, we shall present especially the case of an implementation of a method of an embodiment of the invention by a BPEL execution engine. It is clear however that the invention is not limited to this particular application but can also be implemented in many other fields of process orchestration and more generally in all cases where its advantages are worthwhile.

Figure 3:
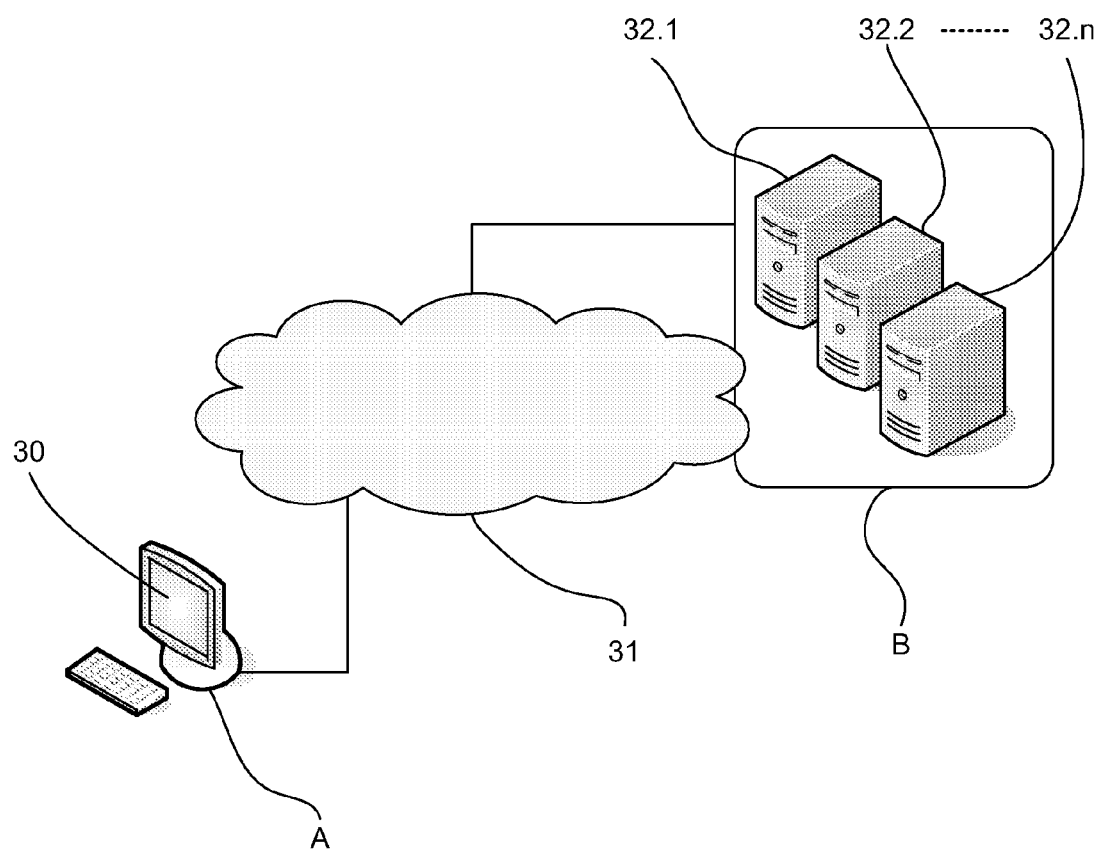
FIG. 3 describes the running of the implementation of a service in a particular embodiment of the invention.

Referring now to FIG. 3, we present an information-processing architecture within which the method that is an object of an embodiment of the invention can be implemented.

A work station "A" has a simple internet browser (30) connected to the network (31) (internet, or intranet for example) implementing the usual Web protocols (especially http). A user of "A" views (through a Web application) a set of information items in a matrix (presentation of information and actions in the form of a table) and can launch actions (such as service invocations) through "assistants" (i.e. programs that assist users during information entry operations).

A platform or hub "B" (formed by one or more servers) places this web application at the disposal of "A". A part of the data handled by this application comes from an XML database. Furthermore, the modification of the data is done through the launching of applications processes orchestrating calls to service bricks accessible in the form of Web services.

To this end, the platform or hub "B" has available Web services and/or applications servers (32.1, 32.2, . . . 32.*n*) which:

make available the Web application (usable especially by "A" through the Web browser 10);

implement the method of an embodiment of the invention.

The different components of the hub "B" can be distributed over several different physical servers.

Only the Web application is accessible to "A" through a Web server of "B". The other components of "B" are not accessible to "A".

Figure 4:
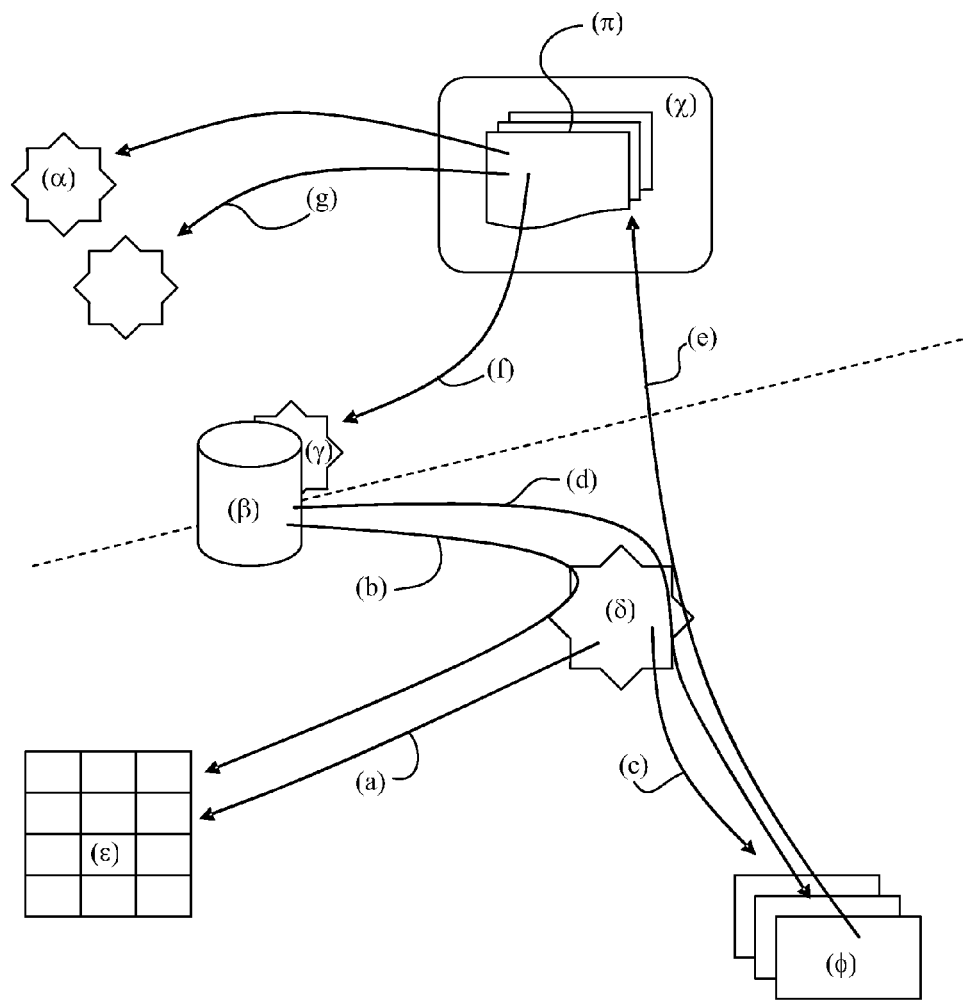
FIG. 4 provides a detailed view of the sequencing of the actions of FIG. 3.

Referring now to FIG. 4, we present the constituent elements of the hub "B" of FIG. 3:

an XML database (β) having available a synchronous Web service connector (i.e. a connector that accepts SOAP messages) permitting certain actions on data stored in the base (i.e. the addition, modification, elimination of certain pieces of data as well as the controls associated with error forwarding as the case may be);

a Web application (δ) generating a matrix (ε) displayed in the browser of "A" as well as assistants (φ) enabling the user of "A" to launch BPEL applications processes (χ). This application adapts the display of the matrix according to the data present in the XML database;

an engine for executing BPEL processes (χ) running the applications processes which are deployed and, during these applications processes, calling up applications Web services (α) as well as the synchronous Web service (γ) situated in the XML database (β);

It is understood of course that the constituent elements (α), (β), (δ) and (γ) can be distributed over several different physical servers.

Again referring to FIGS. 3 and 4, we present the detail of an implementation of the method of an embodiment of the invention.

When the user of "A" calls on the Web application (δ), the matrix (ε) is displayed (a) in its browser. This matrix groups together a set of information items coming from the XML database (β) displayed (b) by the Web application (δ).

When the user of "A" wishes to activate a BPEL applications process (π) by means of the BPEL process execution motor (χ), he selects an appropriate element present within the matrix which activates (c) the display of an assistant (φ) adapted to the process to be executed.

The assistant (φ) comprehensively has the role of making the user of "A" fill in the information needed for launching the applications processes. To facilitate the entry (i.e. the pre-filling of certain fields), the assistant can interact (d) with data coming from the XML database (β).

The user of "A" fills in the information required into the assistant (φ) and validates his choices.

The validation action calls up (e) the corresponding applications process (π). Since the applications process (π) is a BPEL process, the call (e) corresponds to the sending of a simple SOAP message.

Subsequently, according to the business logic concerned, the applications process (π) will send calls in sequence to different Web services (α) which may be numerous and the sequencing of these callees may last for a certain time, potentially greater than the "timeout" corresponding to the calling of the Web service process (π) by the assistant (φ).

In a classic operation of management of asynchronism (implementing for example "WS-Addressing"), it would have been necessary therefore for the assistant (φ) to call the web service process in asking it to respond to a determined URI with an instance identifier when the applications process (π) would end, something that cannot be envisaged here, the assistant (φ) being actually a Web form capable solely of calling a Web service (and not a complex application).

Thus, since the assistant (φ) is only a simple client of a synchronous Web service, the BPEL applications process (π) must behave in this way relatively to the assistant (φ), i.e. it must behave synchronously.

To this end, according to an embodiment of the invention, the orchestration engine (χ) of the BPEL process (π) starts by calling up (f) the synchronous Web service (γ) of the XML data base (β) in order to insert a piece of information therein indicating the fact that the action is launched, and then immediately respond to the assistant (φ) to the effect that the action has been taken into account, for example that an execution is impossible because of an execution already in progress.

If, at the time of insertion, the synchronous Web service (γ) of the database perceives the fact that a piece of information of the same type has already been positioned (for example by another user of the application), the synchronous web service (γ) returns an error message to the BPEL applications process (π) which in turn sends back an error message to the assistant (φ) and stops its running there. An implementation of this kind blocks concurrent data modifications.

With respect to the assistant (φ), the Web service of the BPEL applications process (π) therefore really behaves like a simple synchronous Web service responding to a request by a piece of information of the type "action taken into account/ problem encountered". Since the synchronous Web service (γ) at the front of the XML database is itself synchronous and swift, this implementation does not induce any notable delay.

The assistant (φ) then displays the message to the user of "A" when the display of the application (δ) in the browser 30 is refreshed (manually or automatically, using an appropriate script). The content of the matrix is reloaded by the Web application (δ) in using the XML (β) database: thus, an ad hoc indicator is positioned in the matrix (for example action in progress/error) informing the user (this is valid of course for every user linking up to the Web application).

For its part, the BPEL applications process (π) continues to run asynchronously with respect to the initial call made by the assistant (φ): it sequences the calls (g) to the Web services (α) which may be synchronous or asynchronous depending on the needs and possibilities of the bricks concerned: the overall duration of the process is of little importance.

At the end of these actions, the BPEL orchestration motor (χ) calls (f) the synchronous Web service (γ) of the data base in order to send it the pieces of information on the action performed and the indicator used to mention the fact that the action has been performed or that, on the contrary, an error has occurred: the process is then terminated (it therefore does not respond directly to the initial caller, namely the assistant, as in a "normal" case of an asynchronous BPEL applications process).

It must be noted that the process can distinguish several cases of errors: non-blocking errors (i.e. errors occurring during the process but which the process has managed to correct by cancelling the calls concerned) and blocking errors (i.e. errors for which the process has not been able to make the correct cancellation).

Thus, depending on the nature of the error, the indicator positioned in the database is not the same, thus enabling either the ability to relaunch the process (in the event of a non-blocking error) or to prevent any relaunching before manual intervention (in the case of a blocking error). In the case of blocking errors, the Web application (δ) (using the matrix) prohibits the relaunching of the actions concerned (thus the user does not have to fill in the assistant (φ) and validate it before getting, in return, the message "action impossible").

When a user of "A" refreshes the display of the application in his browser and when the running of the comprehensively asynchronous BPEL applications process (π) is terminated, the Web application (δ) (using the matrix) displays the information on the action performed, this being information from the XML database (β).

1.1 Example of Use in the Context of a "Provisioning" System

A provisioning system enables an information system (containing for example contract information on the clients of a service provider) to initialize the clients on service hubs.

A provisioning system of this kind must, on the basis of data provided by a user, implement many applications process to enable a client to benefit from the services to which he has subscribed.

In one example of such a system, again with reference to FIG. 4, the matrix (ε) groups together in list form (rows) users of services (services which are columns of the matrix (ε)). The matrix is displayed in the browser of the user of the workstation "A".

When the user of "A" wishes to activate an applications process, for example an "Assignation of an IP Centrex service" (making it possible to pool a PABX) to a given client, he selects the corresponding element in the matrix. This selection makes it possible to display an assistant (φ) in which the user will enter information needed for the assignation.

Once the information has been entered and the validation done, the assignation applications process is launched. The application process, after having requested the insertion (f) of information into the XML database (β) responds to the assistant (φ) which displays a piece of information indicating the launching of the process.

Once the screen has been refreshed, the matrix (ε) displays, for example in the form of an icon "Allocation In Progress" the asynchronism of the allocation (the refreshing of the information consists in re-reading the information in the XML database and, in doing so, finding the indicator of the allocation in progress which has been positioned at the request of the process).

In the meantime, the execution of the allocation applications process continues with calls made on the different bricks of applications services concerned.

Once the application is terminated, and once the process has positioned the information on new allocation in the XML database, the matrix (ϵ) displays the icon indicating the fact that the "IP Centrex" service has been allocated to this user (after a refreshing, i.e. a re-reading of information in the XML database).

1.2 Other Optional Characteristics and Advantages

Figure 5:
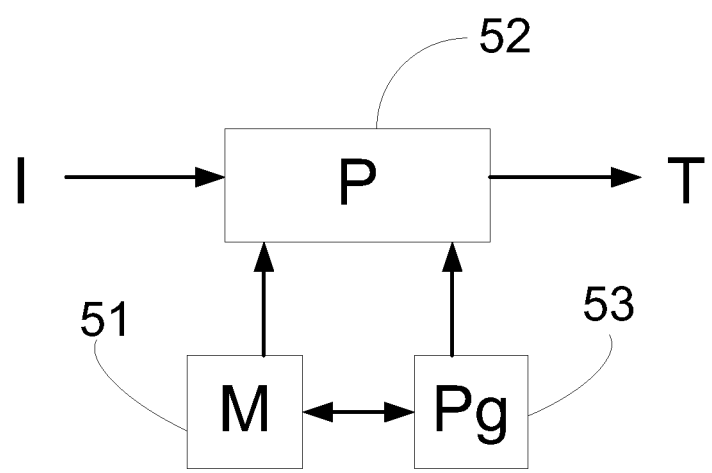
FIG. 5 presents a schematic view of a device for implementing the method of an embodiment of the invention.

Referring now to FIG. 5 we present an embodiment of a device for controlling the running of an applications process.

Such an engine comprises a memory 51 constituted by a buffer memory, a processing unit 52 equipped for example with a microprocessor μP and driven by the computer program 53 implementing the control method according to an embodiment of the invention.

At initialization, the code instructions of the computer program 53 are loaded for example into a RAM and then executed by the processor of the processing unit 52. At input, the processing unit 52 receives at least one piece of information 1 to be transmitted (such as an applications process activation request). The microprocessor of the processing unit 52 implements the steps of the sending method described here above according to the instructions of the computer program 53, to deliver a piece of processed information T (such as a piece of activation information). To this end, the engine comprises, in addition to the buffer memory 51, means for seeking and building synthetic interrogation requests, enabling especially the execution of the control method according to an embodiment of the invention. These means are driven by the microprocessor of the processor unit 52.

Although the present disclosure has been described with reference to one or more examples, workers skilled in the art will recognize that changes may be made in form and detail without departing from the scope of the disclosure and/or the appended claims.

The invention claimed is:

1. A method for controlling at least one application process within a hub formed by one or more servers comprising a plurality of application services, said method comprising:
   receiving in a work station a request for activating at least one application process by the work station;
   transmitting from said work station to said hub at least one piece of information representing a start of activation of said application process called activation information;
   executing each of said application services within said hub;
   transmitting a piece of information representing an end of execution of each of said application services from said hub to said work station, within a time shorter than a time of timeout related to the execution of each of said application services; and
   transmitting at least one piece of information representing an end of activation of said application process from said hub to said work station, taking account of each of said pieces of information representing an end of execution of each of said application services.

2. The method according to claim 1, comprising, prior to transmitting at least one piece of information representing a start of activation, executing a synchronous service delivering said at least one piece of information on activation to be transmitted from said hub to said work station.

3. The method according to claim 1, wherein said at least one application process is of a Business Process Execution Language (BPEL) type.

4. The method according to claim 2 wherein, at the end of executing the synchronous service, the method includes performing another step of executing, on said hub, which inserts said piece of activation information into a data base if such a piece of activation information has not already been inserted relative to said application process, so as to provide an indicator according to which said application process is being executed and cannot be activated again before the end of its current execution.

5. A device for controlling at least one application process comprising a plurality of application services, wherein the device comprises:
   means for receiving a request for activating at least one application process;
   means for transmitting at least one piece of information representing a start of activation of said application process called activation information;
   means for executing each of said application services;
   means for transmitting a piece of information representing an end of execution of each of said application services within a time shorter than a time of timeout related to the execution of each of said application services; and
   means for transmitting at least one piece of information representing an end of activation of said application process, taking account of each of said pieces of information representing an end of execution of each of said application services.

6. A non-transitory computer-readable carrier comprising a computer program product recorded thereon and executable by a processor, the program product comprising program code instructions configured for executing a method for controlling at least one application process comprising a plurality of application services when said instructions are executed by the processor, wherein the method comprises:
   receiving a request for activating at least one application process;
   transmitting at least one piece of information representing a start of activation of said application process called activation information;
   executing each of said application services;
   transmitting a piece of information representing an end of execution of each of said application services within a time shorter than a time of timeout related to the execution of each of said application services; and
   transmitting at least one piece of information representing an end of activation of said application process, taking account of each of said pieces of information representing an end of execution of each of said application services.

* * * * *

UNITED STATES PATENT AND TRADEMARK OFFICE
CERTIFICATE OF CORRECTION

| | | |
|---|---|---|
| PATENT NO. | : | 8,543,435 B2 |
| APPLICATION NO. | : | 12/743091 |
| DATED | : | September 24, 2013 |
| INVENTOR(S) | : | Pierre Bregant-Belin |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this

Fifteenth Day of September, 2015

Michelle K. Lee
*Director of the United States Patent and Trademark Office*